United States Patent
Colovic

Patent Number: 6,079,156
Date of Patent: Jun. 27, 2000

[54] SELF-WATERING PLANTER EMPLOYING CAPILLARY ACTION WATER TRANSPORT MECHANISM

[76] Inventor: Alex J. Colovic, 21352 Rambla Vista Dr., Malibu, Calif. 90265

[21] Appl. No.: 09/312,934

[22] Filed: May 17, 1999

[51] Int. Cl.$^7$ ..................................................... A01G 27/04
[52] U.S. Cl. ..................................................... 47/81
[58] Field of Search .................................. 47/79, 80, 81, 47/66.6

[56] References Cited

U.S. PATENT DOCUMENTS

| | | |
|---|---|---|
| 1,342,786 | 6/1920 | White . |
| 1,450,633 | 4/1923 | Hudson . |
| 1,977,827 | 10/1934 | Kneller . |

(List continued on next page.)

FOREIGN PATENT DOCUMENTS

| | | | |
|---|---|---|---|
| 2610613 | 9/1977 | Germany | 47/81 |
| 2628392 | 12/1977 | Germany | 47/81 |
| 2040659 | 2/1979 | United Kingdom | 47/81 |
| 2,072,185 | 3/1937 | Schein . | |
| 2,157,340 | 5/1939 | Jones . | |
| 3,150,029 | 9/1964 | Ferrand . | |
| 3,786,598 | 1/1974 | Stadelhofer | 47/81 |
| 3,848,359 | 11/1974 | Seith et al. | 49/9 X |
| 3,888,041 | 6/1975 | Seith et al. | 47/9 |
| 3,958,366 | 5/1976 | Meyers | 47/81 |
| 4,001,968 | 1/1977 | Green . | |
| 4,090,325 | 5/1978 | Mushin et al. | 47/9 |
| 4,117,685 | 10/1978 | Skaife . | |
| 4,148,155 | 4/1979 | Allen . | |
| 4,160,342 | 7/1979 | Dryer . | |
| 4,184,287 | 1/1980 | Roth . | |
| 4,211,037 | 7/1980 | Green . | |
| 4,231,188 | 11/1980 | McGuire et al. . | |
| 4,232,482 | 11/1980 | Watt et al. . | |
| 4,245,434 | 1/1981 | Green . | |
| 4,276,720 | 7/1981 | Lyon . | |
| 4,324,070 | 4/1982 | Swisher . | |

OTHER PUBLICATIONS

English Translation of Nichten reference, Federal Republic of Germany, Published Application 26 28 392 (Date of Appln.: Jun. 24, 1976).

Condensed Chemical Dictionary, 1977, Van Nostrand Reinhold Co., p. 808.

*Primary Examiner*—Michael J. Carone
*Assistant Examiner*—Jeffrey L. Gellner
*Attorney, Agent, or Firm*—Pretty, Schroeder & Poplawski, P.C.

[57] ABSTRACT

The self-watering assembly is used in combination with a conventional planter having flow hole apertures formed within a base thereof. The assembly includes a set of water-permeable flow hole inserts each including a portion of capillary material such as spandex. The flow hole inserts are inserted into a flow hole of the planter for direct contact with soil positioned therein. The flow hole inserts are sized and shaped to securely fit within the flow hole preventing soil from falling out of the flow hole and preventing roots from growing through the flow hole. Additional capillary material, also formed of spandex, couples an interior of a water reservoir to the capillary material of the water-permeable inserts. By using spandex as the capillary material, sufficient capillary flow may be achieved to properly water even medium to large sized plants. By employing water-permeable inserts for insertion into the planter wherein the inserts have capillary material mounted therein, water can be more effectively drawn into the soil of the planter as compared to many self watering planters wherein the planter merely rests on capillary material. Also, upon removal of the planter from the water reservoir, the inserts typically remain mounted within the flow holes of the planter such that soil from the planter is prevented from falling out of the planter via the flow holes. Entirely conventional planters may be employed thereby reducing overall costs which permit the customer a wide choice of planter shapes and sizes.

35 Claims, 11 Drawing Sheets

U.S. PATENT DOCUMENTS

| | | |
|---|---|---|
| 4,343,109 | 8/1982 | Holtkamp . |
| 4,356,665 | 11/1982 | de Oliveira . |
| 4,428,151 | 1/1984 | Solomon . |
| 4,434,577 | 3/1984 | Holtkamp . |
| 4,527,354 | 7/1985 | Sellier . |
| 4,557,070 | 12/1985 | Oyama . |
| 4,651,468 | 3/1987 | Martinez et al. . |
| 4,791,755 | 12/1988 | Bilstein . |
| 4,829,709 | 5/1989 | Centafanti ............................ 47/81 X |
| 4,885,869 | 12/1989 | Kim . |
| 4,885,870 | 12/1989 | Fong . |
| 4,937,974 | 7/1990 | Costa, Jr. et al. . |
| 4,950,166 | 8/1990 | Williams . |
| 4,955,158 | 9/1990 | Lyon . |
| 4,962,613 | 10/1990 | Nalbandian . |
| 4,965,963 | 10/1990 | Lyon . |
| 5,002,814 | 3/1991 | Knack et al. . |
| 5,036,619 | 8/1991 | Whitcomb . |
| 5,111,614 | 5/1992 | Holtkamp, Sr. . |
| 5,117,581 | 6/1992 | Green et al. ........................... 47/79 X |
| 5,136,806 | 8/1992 | Kang ....................................... 47/81 |
| 5,189,834 | 3/1993 | Green . |
| 5,189,835 | 3/1993 | Green . |
| 5,193,305 | 3/1993 | Holtkamp, Jr. . |
| 5,193,306 | 3/1993 | Whisenant . |
| 5,247,762 | 9/1993 | Green . |
| 5,259,142 | 11/1993 | Sax . |
| 5,329,729 | 7/1994 | Liang . |
| 5,443,544 | 8/1995 | Azoulay ................................. 47/81 X |
| 5,481,826 | 1/1996 | Dickison et al. . |
| 5,535,542 | 7/1996 | Gardner et al. . |
| 5,568,701 | 10/1996 | Haigler . |
| 5,622,004 | 4/1997 | Gidge . |
| 5,673,511 | 10/1997 | Holtkamp, Jr. . |
| 5,839,659 | 11/1998 | Murray . |

SELF-WATERING PLANTER EMPLOYING CAPILLARY ACTION WATER TRANSPORT MECHANISM

BACKGROUND OF THE INVENTION

1. Field of the Invention

The invention relates to self watering planters.

2. Description of the Related Art

Live plants are commonly provided in homes, offices and the like to provide a more aesthetically pleasing environment and also to help naturally filter the air. A long-standing problem, however, arises from the need to properly water the plants. Traditionally, each plant is individually watered as needed by pouring water directly into the soil of the planter containing the plant. In offices, retail establishments, and the like, professional water service personnel are often employed to water and otherwise maintain the plants. The frequency with which the plants need to be watered depends greatly however upon the type of plant, the ambient temperature, and the amount of light in the vicinity of the plant. As a result of these and other factors, some plants need to be watered once per day, others once per week, others perhaps less frequently. This places a considerable burden on the service personnel which must ensure that each plant is properly watered. As such, costs associated with watering and otherwise maintaining the plants can be substantial, particularly for large office complexes, shopping malls, and the like.

To minimize the frequency by which plants need to be watered, a variety of self-watering planters have been developed over the years. A self-watering planter is provided with a water reservoir connected to a planter for containing a plant such that the planter can draw water from the reservoir as needed by the plant. In this manner, water need not be added to the soil of the planter whenever the soil becomes dry. Rather, as the plant withdraws water from the soil, water is automatically drawn from the water supply into the soil to replenish soil moisture. The frequency by which the reservoir needs to be replenished is often significantly less than the frequency with which the soil would otherwise need to be directly watered if a self-watering planter were not provided. Accordingly, substantial cost savings are achieved as a result of reduction in time required by plant service personnel. Moreover, there is less chance that a plant will become stressed or die as a result of failure to properly and periodically water the plant.

A typical self-watering planter includes a planter portion and a water reservoir integrally formed as a single unit, Flow holes are formed in a base of the planter to permit roots to grow into the water supply portion. The planter further includes a conduit extending upwardly from the reservoir to near a top of the planter to permit the reservoir to be replenished as needed merely by pouring water into a top opening of the conduit. The planter and reservoir are mounted in an external enclosure. Self-watering planters of this type have been effective in reducing the need to frequently water plants, however, considerable room for improvement remains. A first problem associated with self-watering planters of this type is that the integrated self-watering planter can be considerably more expensive than conventional planters. Also, unless the manufacturer provides a set of self-watering planters of many different sizes, shapes and the like, the customer is limited in the choice of plant sizes thereby limiting the desirability of the self-watering planters. Indeed, it may be difficult to find the appropriate container size and shape for particular plants to satisfy the needs of the customer. As one example, some retail establishments, hotels and the like prefer to have very large planters on the order of six feet tall to accommodate trees, bamboo or the like. The cost associated with providing integrated self-watering planters to accommodate such unique requirements may be prohibitive.

Yet another problem associated with integrated self-watering planters arises if the planter needs to be removed from its outer enclosure, perhaps to identify or correct a mechanical failure in the planter or perhaps because some form of plant failure has occurred and the plant itself needs to be replaced. With the planter and the water reservoir integrally formed, the entire assembly may be extremely heavy and awkward to remove from its outer enclosure, particularly if the reservoir is still substantially filled with water. Accordingly, considerable time and effort may be required by plant service personnel to remove the planter from its outer enclosure, thereby increasing associated costs. As can be appreciated, considerable difficulty may occur if a self-watering planter on the order of six feet tall needs to be removed from an external enclosure. Another problem associated with some conventional integrated self-watering planters is that roots of the plant can grow directly into the water reservoir resulting in possible over watering, root rot, clogging problems, or the like.

Accordingly, it would be desirable to provide an improved self-watering planter which overcomes the many disadvantages of the planters thus far described which have a water reservoir integrally formed with a planter. One possible solution is to provide a planter/water reservoir assembly wherein the planter and water reservoir are not integrally formed, but are adapted to mount one to the other. Although this configuration makes it easier to remove the self-watering planter from an external enclosure, problems associated with root rot or plant over watering caused by roots directly growing into the water reservoir are not addressed. Also, if the planter needs to be removed from the water reservoir, soil and other debris often falls through the flow holes of the base of the planter resulting in possible damage to carpets and the like surrounding the planter.

One alternative self-watering planter that has been proposed includes a planter connected to a water reservoir via a capillary system. Water is absorbed from the reservoir by capillary material and ultimately fed into soil of the planter thereby moistening the soil. Heretofore, an ideal capillary material has yet to be identified. In some cases, the capillary material does not provide for a sufficiently fast flow of water to properly water a plant, particularly a large plant located in a sunny or hot area. Also, certain capillary materials have been found to decay rather quickly when immersed in water such that the usable lifetime of the material is minimal. In many cases, the capillary material being used is either too expensive or insufficiently moldable to permit the fabrication of an inexpensive self-watering planter.

Conventionally, the capillary material is positioned to abut a base portion of the planter such that soil or roots within flow holes of the planter lie adjacent to a portion of the capillary material. However, adequate coupling between the capillary material and the soil or roots is often not achieved. For example, if a gap remains between the soil of the planter and the capillary material, water may not be properly drawn into the soil. Thus, although a self-watering planter employing a capillary material may represent an improvement over previous self-watering planters, considerable room for improvement remains. In particular, it would be desirable to provide a self-watering planter employing a capillary material wherein a more effective coupling of the capillary material to soil within the planter is achieved and wherein the risk of spillage of soil from within the planter through flow holes is substantially eliminated. It is also desirable that the self-watering planter have separate planter and water reservoir portions permitting ease of removal of the planter. It is also desirable that the self-watering planter accommodate entirely conventional planters and water reservoirs thereby reducing overall costs while permitting customers a wide variety of choice in components. It is to these ends that aspects of the present invention are primarily directed.

SUMMARY OF THE INVENTION

In accordance with a the invention, various assemblies for watering a plant within a planter are provided.

In accordance with a first aspect of the invention, the assembly comprises a container holding liquid and a capillary-action material formed of spandex coupling an interior of the container to an interior of the planter such that the liquid may be drawn through the capillary-action material from the container into the soil of the planter. By using spandex as the capillary material, sufficient capillary flow may be achieved to water even medium to large sized plants. Moreover, spandex is generally inexpensive and readily available and resists degradation thereby reducing overall costs.

In accordance with a second aspect of the invention, the assembly comprises a planter having one or more flow-holes, a container for holding liquid, a water-permeable insert adapted for insertion into flow holes of the planter, capillary material positioned within the water-permeable insert, and capillary material connecting the container to the capillary material of the water-permeable inserts.

By employing water-permeable inserts for insertion into the planter wherein the inserts have capillary material mounted therein, water can be more effectively drawn into the soil of the planter as compared to many self watering planters wherein the planter merely rests on capillary material. Moreover, if the inserts are sized to fill the flow holes, roots are substantially prevented from growing downwardly out of the planter through the flow holes thereby reducing risk of damage or disease to the roots. Also, upon removal of the planter from the liquid container, the inserts typically remain mounted within the flow holes of the planter such that soil from the planter is prevented from falling out of the planter via the flow holes as may occur with conventional arrangements. The planter, with inserts mounted therein, may be, for example, mounted to a water reservoir having capillary material disposed upon a top surface thereof or may be positioned directly on a table covered by capillary material coupled into water troughs.

In accordance with a third aspect of the invention, the assembly comprises a flexible bag for holding liquid and for mounting within an external enclosure, a large plurality of discrete capillary material members positioned within the flexible bag, and a planter having one or more flow-holes positioned on the discrete capillary members within the bag and within the external enclosure.

By employing a bag containing discrete capillary members and capable of being filled with liquid, a separate water container need not be provided. Moreover, the amount of discrete material placed within the bag can be selected so as to fill the bag to a height sufficient to support the planter with a top perimeter thereof even with a top perimeter of the external enclosure. Hence, a wide variety of sizes of planters can be employed in connection with a wide variety of sizes of external enclosures without requiring any water container or other structure for supporting the planter within the external enclosure.

In each of its embodiments, the invention permits entirely conventional planters to be employed thereby reducing overall costs are permitting the customer a wide choice of planter shapes and sizes. Moreover, by providing a separate planter and liquid container for mounting within an external enclosure, the planter portion can be easily removed from the external enclosure without requiring simultaneous removal of the liquid container as well. Other aspects of the invention are directed to the use of capillary materials in connection with irrigating nurseries, landscapes, parks, sporting fields and the like.

Other objects, advantages and features of the invention will be apparent from the detailed description below in combination with the attached drawings.

DETAILED DESCRIPTION OF EXEMPLARY EMBODIMENTS

Various exemplary embodiments of the invention will now be described with reference to the figures. These embodiments merely illustrate various aspects of the invention and should not be construed as limiting the scope of the invention.

Figure 1:
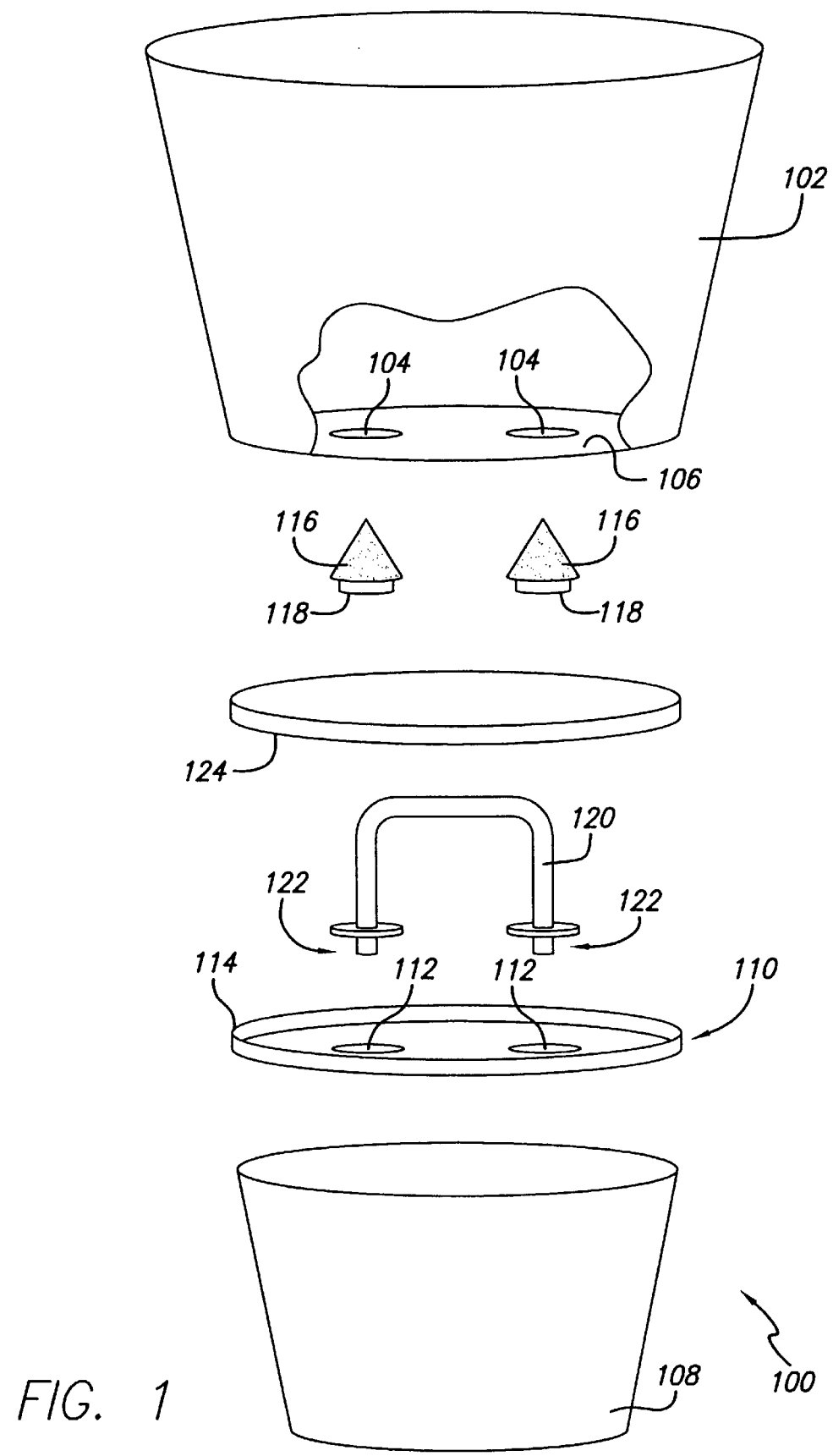
FIG. 1 is an exploded, perspective view of an assembly for watering a plant configured in accordance with an exemplary embodiment of the invention.
Figure 2:
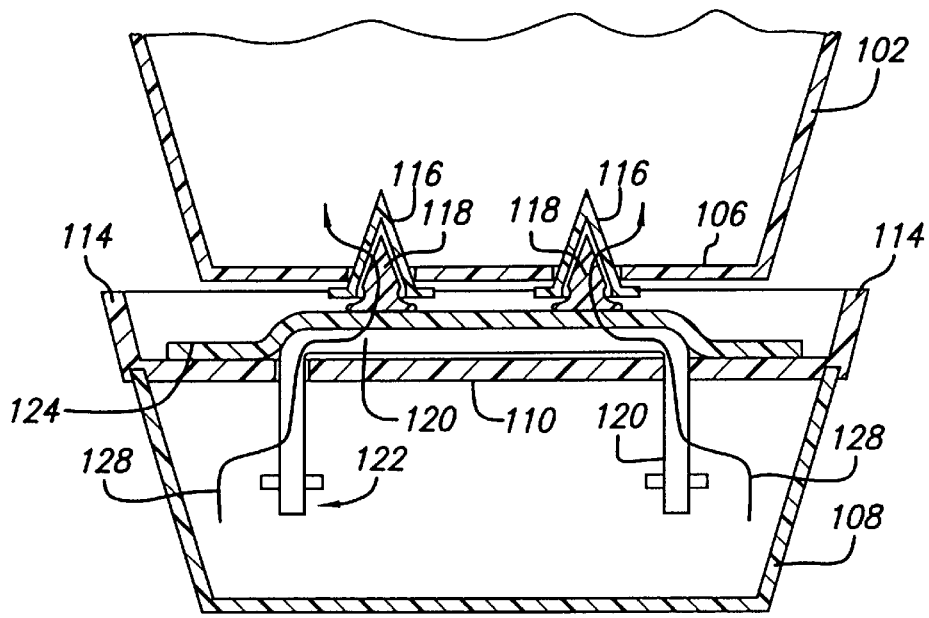
FIG. 2 is a side, cross-sectional view of the apparatus of FIG. 1.

FIGS. 1–2 illustrate a self-watering assembly 100 for use in watering a plant (not shown) contained within a conventional planter 102 having circular flow hole apertures 104 formed within a base 106 of the planter. The self-watering assembly uses capillary action to withdraw water from a water reservoir 108 having a lid 110 with a set of apertures 112 formed within the lid. The lid additionally includes a rim 114 formed around a perimeter thereof.

Self-watering assembly 100 includes a set of water-permeable flow hole inserts 116 each including a portion of capillary material 118 which protrudes slightly from a base of the insert 116. Flow hole inserts 116 are generally conical as shown and are, in use, inserted into the circular flow hole 104 of the planter for direct contact with soil positioned therein. The flow hole inserts are preferably sized and shaped to securely fit within the flow hole preventing soil from falling out of the flow hole and preventing roots from growing through the flow hole. The inserts preferably fit snugly such that, even when the planter is manually lifted, the inserts do not fall out of the flow holes, which might result in discharge of soil and the like from within the planter.

Self-watering assembly 100 also includes a flexible strand of capillary material 120 sized for insertion through apertures 112 of lid 110. Ends 122 of capillary material 120 are weighted to remain submerged within water contained within reservoir 108. A central portion of the capillary strand lies across a top surface of lid 110. Assembly 100 also includes a generally circular sheet of capillary material 124 which lies across the top surface of lid 110 covering most of the top surface.

The assembled configuration is shown most clearly in FIG. 2. As can be seen, with the components assembled as shown, portions of capillary material 118 of flow hole inserts 116 press against a top surface of capillary sheet 124 while a bottom surface of capillary sheet 124 presses against central portions of capillary strand 120 that lie along the top surface of lid 110. Ends 122 of strand 120 remain submerged within a liquid (not shown) contained within reservoir 108. The liquid includes water, perhaps along with nutrient mixtures, pesticide mixtures, and the like.

With this configuration, liquid is drawn from within reservoir 108 via capillary action into soil within planter 102 as shown by arrows 128. More specifically, the liquid is drawn by capillary action vertically along end portions 122 of capillary strand 120 into central portions of strand 120. Portions of the liquid are then drawn via capillary action from strand 120 through sheet 124 and into capillary material 118 contained within flow hole insert 116. Capillary action continues to draw the liquid vertically through the interior of the flow hole inserts to top portions of capillary material 118 which are in direct contact with the soil of the planter. The liquid is then absorbed into the soil and is subsequently withdrawn from the soil by the plant via roots of the plant. As the liquid is withdrawn from the soil by the plant, continued capillary action replenishes moisture within the soil by continuously withdrawing liquid from within the reservoir. In this manner, the plant is continuously watered to the extent required by the plant until the liquid within the reservoir is depleted. Periodically the reservoir is replenished. This is achieved by simply pouring water onto a top surface of the soil of the planter. Some of the water is absorbed into the soil while excess portions flow downwardly through the soil, pass through flow hole insert 116, ultimately pouring into reservoir 108. Preferably, a quantity of liquid is provided which is sufficient to moisten the soil with sufficient excess liquid to completely fill the reservoir container. Ridge 114 of lid 110 is provided to ensure that liquid flowing downwardly out of the planter is directed through apertures 112 of the lid and into the reservoir.

Preferably, the capillary material employed within the self-watering apparatus 100 is formed of spandex. Spandex is inexpensive and widely available. It can be cut and shaped as needed to form the various capillary components of the self-watering assembly. Moreover, spandex is substantially immune to deterioration or degradation that may affect other types of cloth capillary materials immersed in water. Spandex also provides a highly favorable velocity of capillary flow to provide an adequate amount of liquid to the soil of the planter, without over watering the soil. Other types of capillary material either may not provide a sufficiently fast capillary flow to properly replenish the moisture of the soil of large planters or may provide capillary flow which is too fast, resulting in possible over watering of the plant of small planters. However, although spandex is preferred, other types of capillary material may be employed in connection with alternative embodiments of the invention.

Figure 3:
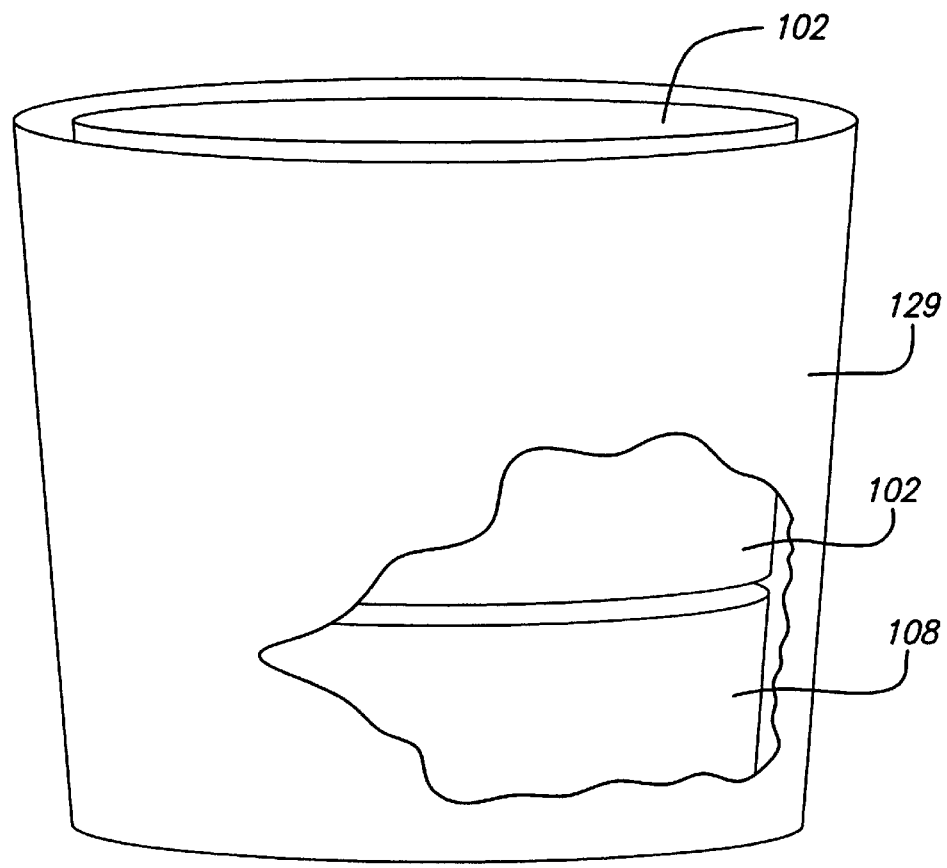
FIG. 3 is a perspective view of the assembly mounted for use within an external enclosure.

FIG. 3 illustrates the self-watering planter assembly mounted within an external enclosure 129 which may be entirely conventional.

Thus, FIGS. 1–3 illustrate a self-watering assembly for use in conveying water from a water reservoir to a planter. One particularly advantageous aspect of the self-watering assembly is that it does not require specially configured planters, water reservoirs, or the like. Rather conventional planters and water reservoir containers may be used. Accordingly, overall costs associated with the self-watering assembly are minimal. Moreover, the assembly is formed of relatively few parts of simple construction, thus further minimizing overall costs. By permitting the use of separate a planter and water reservoir, the planter can be removed without requiring simultaneous removal of the reservoir. Thus, if some type of failure occurs requiring that the plant be removed from its external enclosure, only the planter need be removed, rather than a planter/water reservoir integrated unit. This greatly reduces the amount of weight which needs to be removed from the external enclosure, thereby reducing associated costs and minimizing the risk of injury to personnel employed to remove the planters. This advantage is particularly important if the planter or water reservoir, or both, is extremely large and heavy. Note that many commercial and retail locations often install planters containing trees, bamboo, or the like wherein the planters are six feet tall or more. As can be appreciated, by permitting the use of entirely conventional planters, overall costs can be greatly reduced as compared to a self watering planter wherein a specialized integrated planter/reservoir is required meeting those large dimensions.

Another important advantage of the invention is that the flow hole inserts fit snugly within flow holes of the conventional planter, even when the planter is lifted or carried about. This prevents soil from falling through the flow hole thereby minimizing the need to clean up in the vicinity of the planter after the planter has been inserted into, or removed from, its external enclosure. This is particularly advantageous in commercial establishments such as restaurants, hospitals and the like wherein utmost cleanliness is required. Thus, if a plant needs to be replaced, perhaps as a result of illness to the plant or to provide a new variety of plant, the planter is simply removed and replaced with a new planter containing new or different plants. Preferably, new flow hole inserts are inserted into the new planter prior to mounting to the self-watering assembly within the external enclosure. Alternatively, the flow hole inserts of the planter being removed can be extracted from the planter and inserted into the new planter prior to placing the new planter into the external enclosure. Another advantage of the flow hole inserts is that they substantially prevent roots from growing downwardly out of the planter through the flow hole apertures and directly into the water supply as can occur in many conventional self-watering planter arrangements. If roots are permitted to grow directly into the water supply, root rot or plant over watering can occur.

Figure 4:
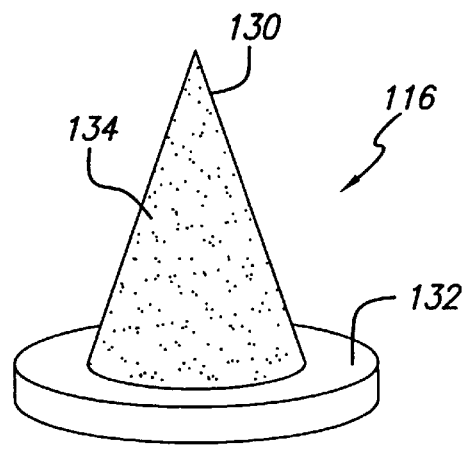
FIG. 4 is a perspective view of a single water-permeable flow hole insert of the embodiment of FIG. 1.

FIG. 4 illustrates an individual flow hole insert 116. As can be seen, the insert has a generally conical portion 130 extending upwardly from a circular base 132. The insert is preferably formed of a rigid or semi-rigid plastic or nylon material with the conic portion including numerous holes or apertures 134. The interior of conic portion 130 is hollow permitting insertion of capillary material. Preferably, the capillary material extends slightly beyond the base of the insert ensuring direct contact with capillary material of the sheet upon which the planter is positioned. Conic portion 130 is preferably sized and configured to be easily inserted within a wide range of flow hole sizes to accommodate a wide variety of conventional planters. Depending upon the size of the flow hole, the conic portion may be either inserted completely into the planter, or perhaps only partially inserted. Perimeter portion 132 extends outwardly to help prevent soil from spilling out of the planter, particularly if the conic portion is sized for complete insertion into the planter thereby permitting the base portion to lie flush against a bottom outside surface of the planter. Also, preferably, various sizes of flow hole inserts are provided, to accommodate an even wider range of flow hole sizes within conventional planters.

Figure 5:
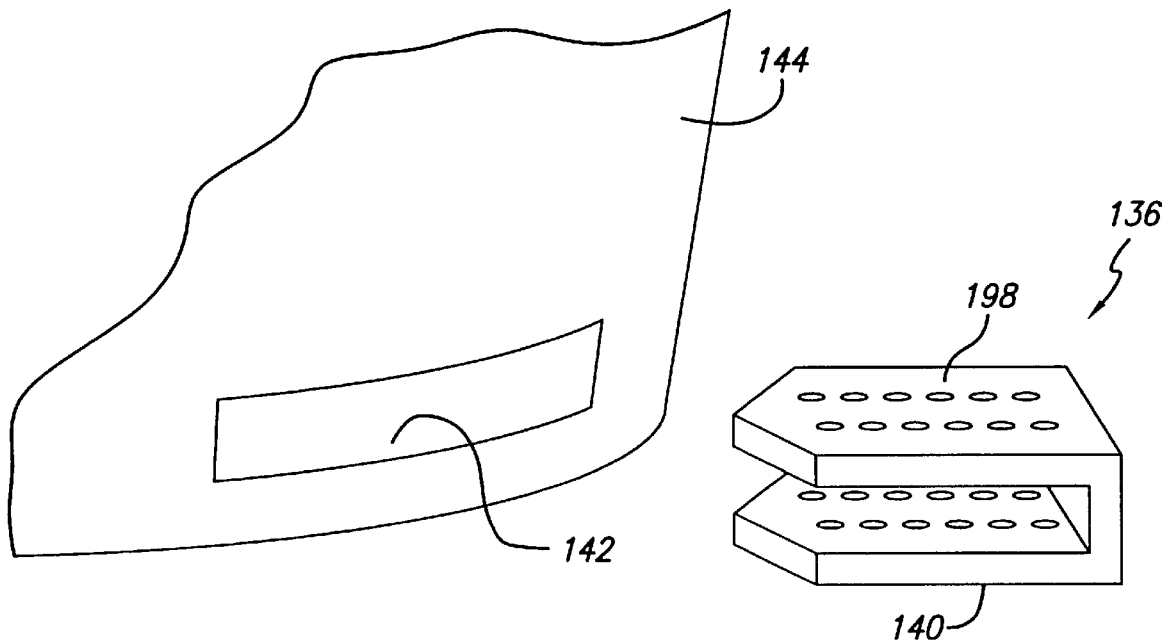
FIG. 5 is a perspective view of an alternative configuration of the flow hole insert of FIG. 4, configured for use with a planter having slots along a side surface rather than circular apertures on a bottom surface.

FIG. 5 illustrates an alternative configuration of a flow hole insert for use with conventional planters having slotted flow holes formed around the base of side portions of the planter, rather than circular apertures formed directly through the base of the planter. The alternative insert 136 is generally U-shaped with flat top and bottom extending portions 138 and 140, respectively. The U-shaped insert is sized such that top portion 138 may be inserted within a flow hole slot 142 of a conventional planter 144 while bottom extending portion 140 lies adjacent to a bottom outside surface of the base of the planter. The interior of the U-shaped insert 136 is filled with a capillary material, such as spandex. Thus, with the U-shaped inserts inserted into the planter, and with the planter mounted onto the capillary sheet lying along the top surface of the liquid reservoir, the capillary material of the U-shaped insert draws liquid from the sheet into the soil for moisturizing the soil. Preferably, several such U-shaped inserts are mounted into the planter around the perimeter of the planter via flow hole slots provided therein.

Referring again to FIGS. 1 and 2, capillary sheet 124 although strongly preferred is not absolutely required. Rather, planter 102 can be positioned on lid 110 so as to place protruding portions of capillary material 118 of flow hole insert 116 directly against central portions of capillary strand 120. With numerous apertures formed within lid 110, the capillary strand 120 can be positioned as needed to permit proper alignment of insert 116 and strand 120. Hence, the capillary sheet is not required, rather merely preferred as it eliminates the need to ensure proper alignment. This is particularly desirable if the planter is periodically rotated, perhaps to compensate for a non-uniform light source. Without the capillary sheet, the planter may be inadvertently rotated to a position where the capillary material of the flow hole inserts does not properly line up with the capillary material of the capillary strand.

Figure 6:
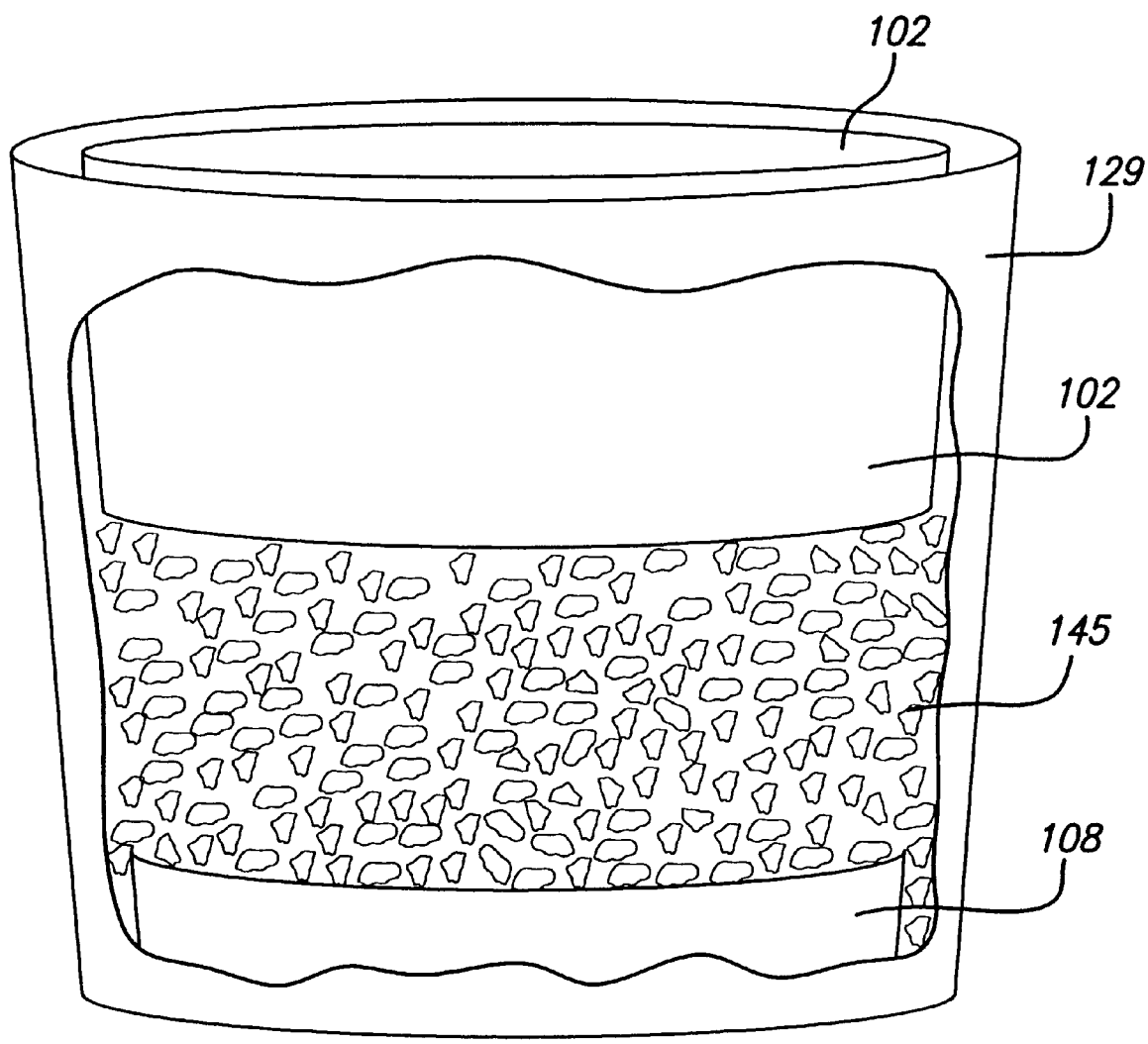
FIG. 6 is a side cross-sectional view of an alternative embodiment of the self-watering planter apparatus of the invention employing a large number of discrete capillary members positioned between a water reservoir and a planter.
Figure 7:
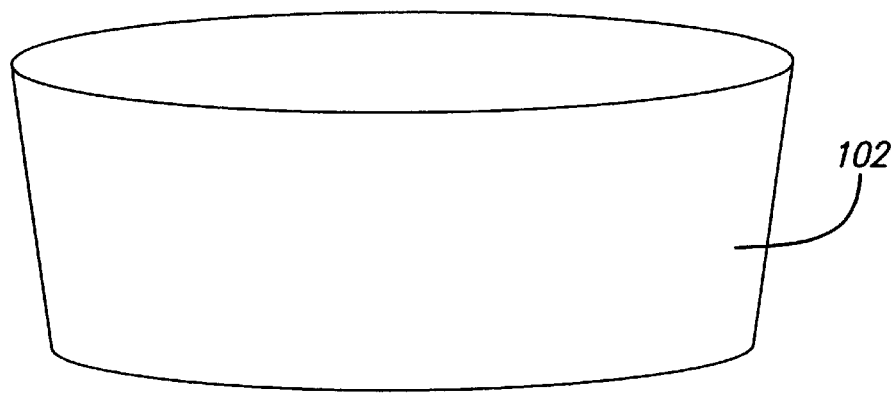
FIG. 7 is a side cross-sectional view of a self-watering planter wherein an external enclosure is lined with a plastic material filled with discrete capillary members such that a separate water reservoir container is not required.
Figure 7:
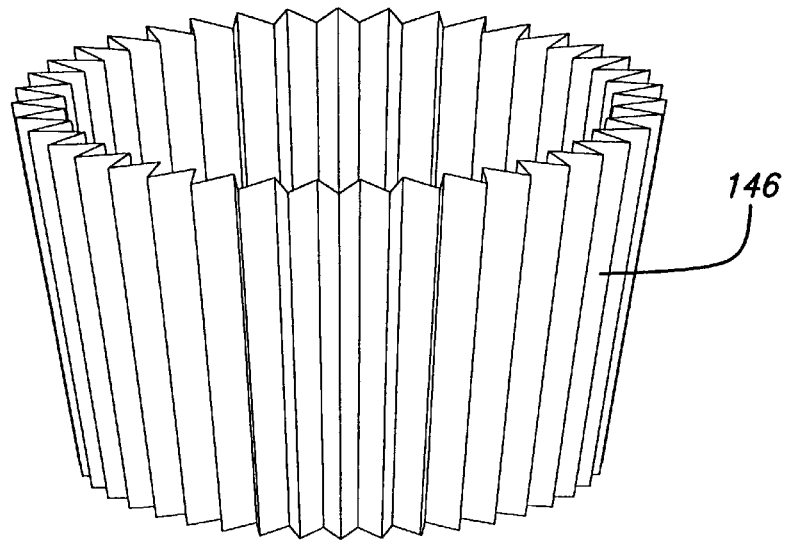
Figure 7:
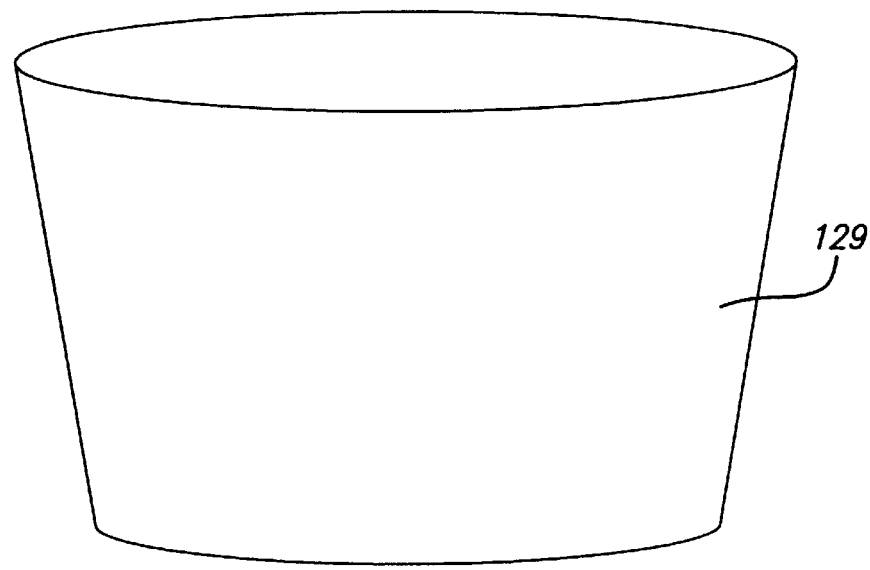

Thus, the capillary sheet is helpful in ensuring proper alignment. Although described and illustrated with reference to a thin sheet, the capillary sheet may in fact be a thick disk or disk-like member sufficient to elevate a base of the planter high above the lid of the water reservoir. This is particularly desirable in circumstances where the external enclosure in which the planter is to be inserted is extremely large, although the planter itself is relatively small. Two or more capillary disks may be employed to accommodate external enclosures of various heights. In the alternative, if the planter needs to be positioned well above the lid of the reservoir, the space may be filled, as shown in FIG. 6, with a large number of discrete capillary members 145, such as peanut-shaped members or the like. Hundreds, thousands, or more of the discrete members are poured into the external enclosure between the lid of the liquid reservoir as needed to position the planter at a desired height within the external enclosure. Also, with this configuration, the liquid reservoir itself need not have a lid. Rather, the discrete capillary members may simply be poured directly into the reservoir as well. Indeed, a rigid reservoir itself need not be employed. Rather, the external enclosure may be lined with a plastic bag to provide a water reservoir. This embodiment is illustrated in FIG. 7. More specifically, FIG. 7 illustrates an external enclosure lined with a flexible water-impermeable bag 146 formed of a plastic material such as thin plastic sheet. The enclosure is then filled with capillary material (not separately shown in FIG. 7) such as the aforementioned discrete capillary members. A planter is positioned on top of the discrete capillary members, then water is poured directly into the soil of the planter with excess water filtering down through the capillary material to the bottom of the plastic bag providing a water reservoir. Preferably, a sufficient amount of water is poured into the planter to fill the external enclosure up to just below the base of the planter. In this manner, a maximum water reservoir capacity is achieved. Also, as shown in FIG. 7, the plastic liner material is preferably pleated for ease of insertion.

Figure 8:
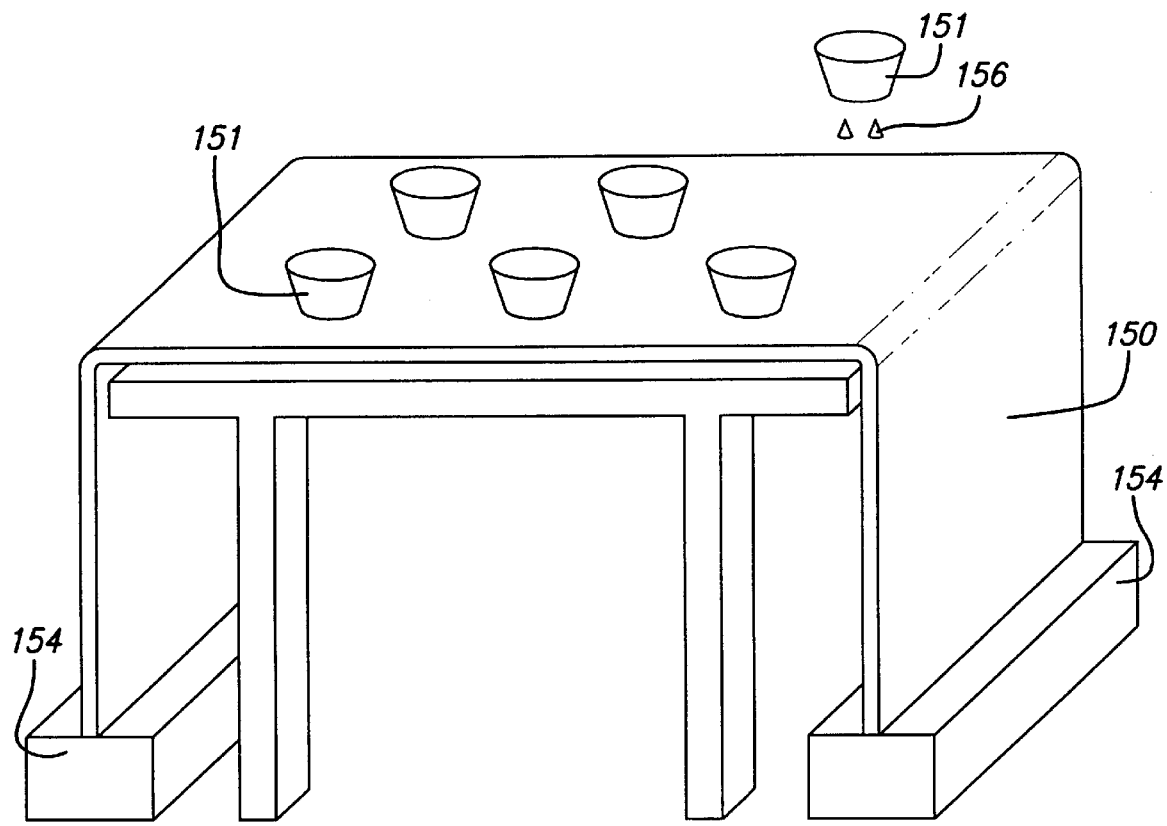
FIG. 8 is a perspective view self-watering planter table having a set of individual planters with capillary flow hole inserts mounted therein positioned on a sheet of capillary material connected into water troughs.

FIG. 8 illustrates a self-watering assembly for simultaneously watering a large number of planters. The assembly includes a large capillary sheet 150 stretched across a top surface of a table 152. Opposing ends of sheet 150 lie within water troughs 154, with the lower ends of the sheet weighted as needed to ensure that the ends remain immersed within the liquid. A set of planters 151, each having one or more flow hole inserts 156 of the type described above is positioned on the capillary sheet. In this manner, liquid is drawn from the troughs 154 up to a top surface of the table, then drawn via capillary action directly into the soil of the various planters. By employing flow hole inserts 156 within the planters, better conduction of liquid directly into the soil is achieved as compared to an embodiment wherein the planters are simply placed directly on the capillary sheet, thereby improving the extent to which self-watering occurs. Also, with the flow hole inserts inserted within each flow hole of the planters, the planters can be easily removed from the table without a risk of spilling soil or the like from within the planter onto the table. Moreover, the flow hole inserts substantially prevent roots from within the planters from directly growing out onto the capillary sheet which may result in some degree of over watering and which could result in tearing or damage to the roots when the planters are removed from on top of the sheet.

Figure 9:
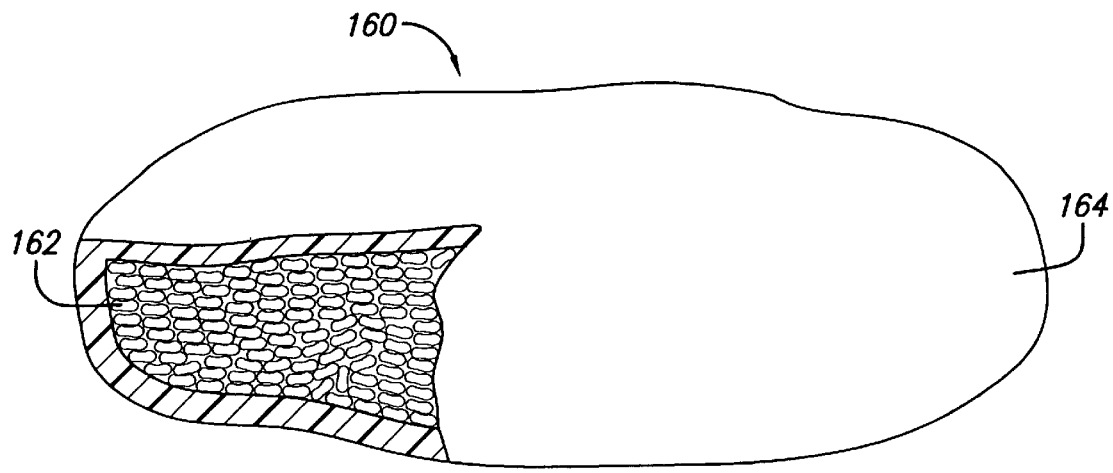
FIG. 9 is a perspective view of bag for use with a self-watering planter wherein the bag is formed of a capillary material filled with perlite.
Figure 10:
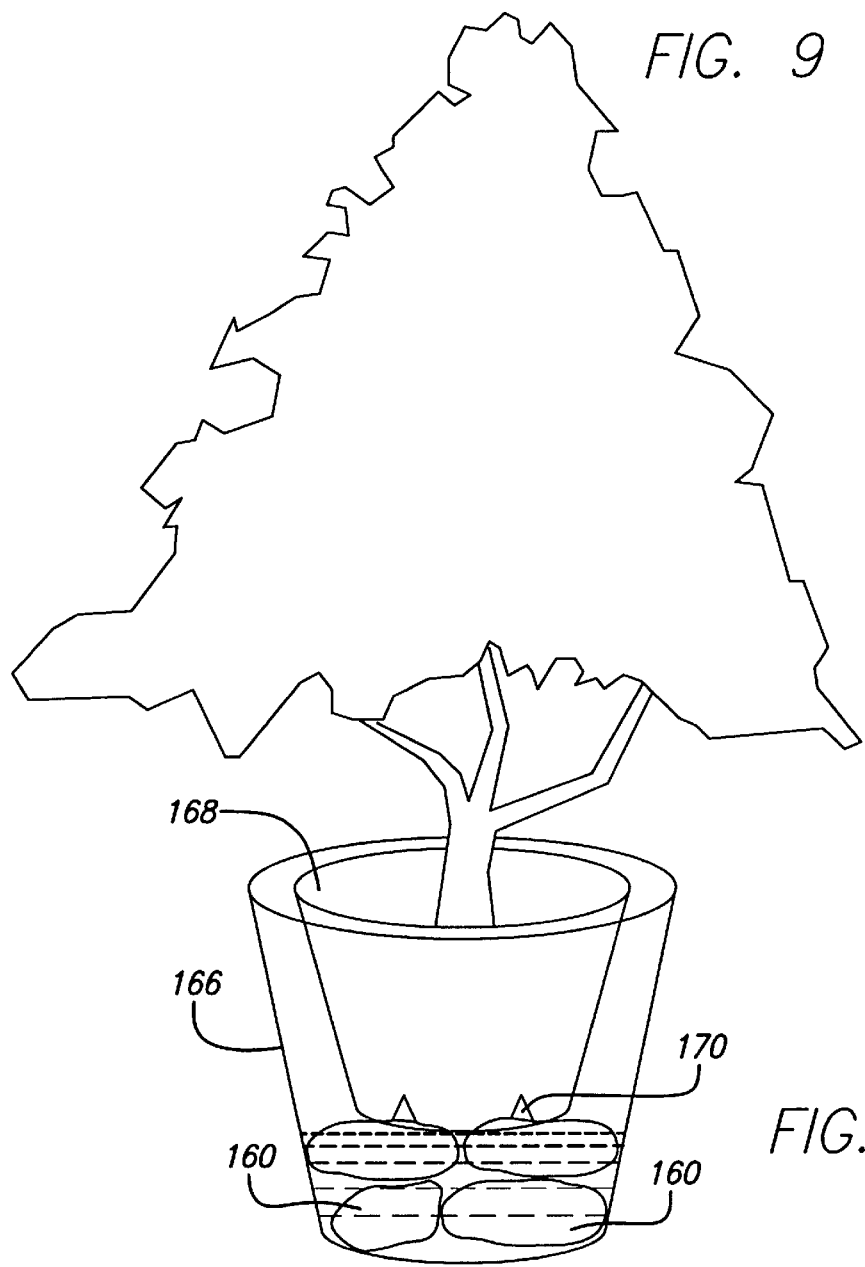
FIG. 10 is a perspective view of a self-watering planter mounted within an external container filled with a set of the bags of FIG. 9.

FIGS. 9 and 10 illustrate a self-watering planter assembly including one or more bags filled with perlite wherein the fabric of the bag enclosure is a capillary material, such as spandex. More specifically, FIG. 9 illustrates a single bag 160 having hundreds of pieces of perlite 162 contained within a capillary material bag 164. FIG. 10 illustrates a set of bags 160 in use within an external enclosure 166 for supporting a planter 168 having flow hole inserts 170 inserted therein. As can be seen, the capillary material bags fill the bottom of the external enclosure and support the planter. The external enclosure is filled with water to a level just below the base of the planter. In use, the capillary material of the bags draws water to the flow hole inserts for subsequent propagation into the soil of the planter. The water is drawn as needed by the plant. By filling the capillary material bags with perlite, a relatively small planter is thereby supported within a relatively large external container. Moreover, each individual bag is light and the total amount of capillary material required is relatively small. Also, by using perlite or other similar water-absorbing materials, a considerable volume of water is accommodated below the base of the planter while the planter is simultaneously supported.

In the alternative, a single bag is mounted within the external enclosure. As can be appreciated, the individual bags can be of differing shapes and sizes. For ease of fabrication, the bags are preferably oblong. However, other shapes may alternatively be employed.

Figure 11:
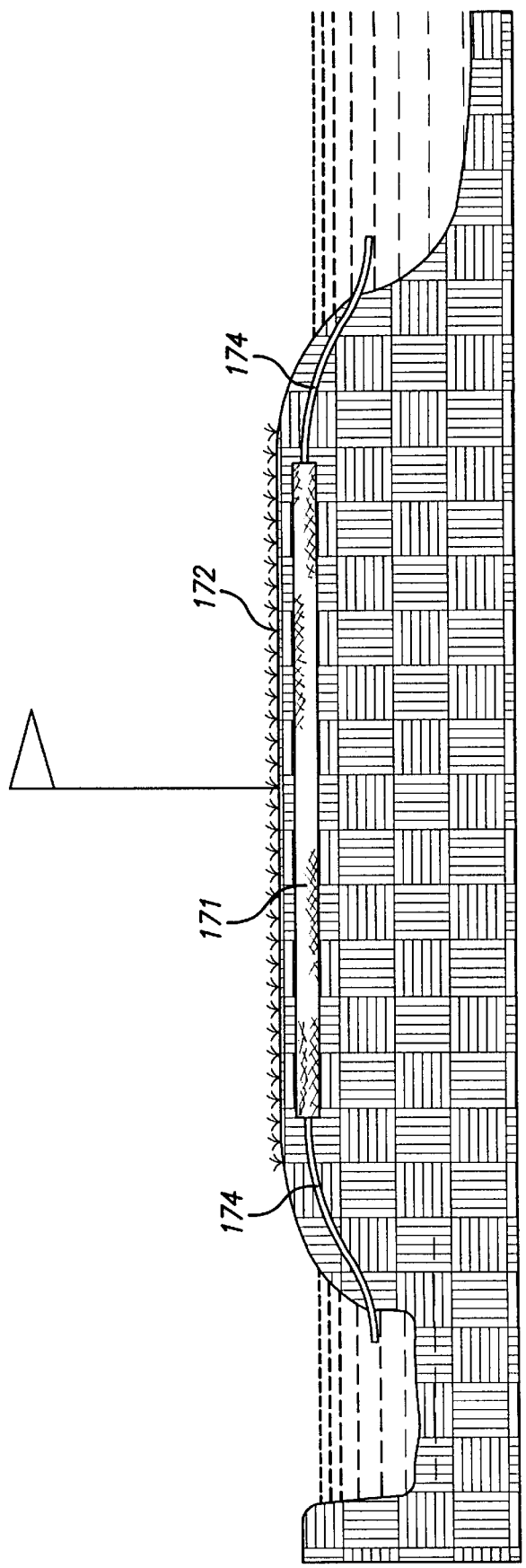
FIG. 11 illustrates the use of a capillary netting material mounted beneath turf for drawing water from a nearby pond or stream into the turf.

FIG. 11 illustrates the use of a capillary material netting 171 for drawing water to turf 172, such as turf used in golf courses, parks or the like. The capillary netting is preferably formed of a mesh of interlocking strands of spandex separated, for example, by about four inches from one another. The netting is positioned just below the roots of turf 172 and if preferably cut to match the perimeter of the turf to be watered. In practice, the netting is positioned on the soil first, then pre-grown turf is rolled out onto the netting. In the example of FIG. 11, the turf is a golf course green of a substantially oblong shape. Hence, the capillary netting is cut to same oblong shape. The netting is preferably further cut to accommodate trees and other deep rooted plants and to accommodate any structures such as the golf hole assembly illustrated in the figure. The netting is also preferably contoured to follow the shape of the landscape. Two or more nettings may simultaneously be used.

One or more soaker hose tubes 174 covered with a capillary material, such as spandex, are provided to interconnect nearby water sources to the capillary netting. In FIG. 11, two tubes 174 are provided, one connected to a nearby stream, the other connected to a nearby pond. Each tube may be a conventional flexible hose or tube with capillary material stretched around the outside, or filled within the interior, or both. With this configuration, water is drawn from the stream or pond via the capillary material of the soaker hoses into the netting and ultimately into the roots of the turf. In this manner, water is supplied to the turf as needed by the grass of the turf without requiring any pumps or other irrigation systems. As a result, there is little or no waste of water such as can occur with overhead watering systems as a result of over spray onto sidewalks, buildings, driveways and the like. In general, there is substantially no runoff or leaching from the turf as well and no over watering of the roots of the turf. Hence, the turf receives just as much water as needed with substantially no waste and without the need for potentially expensive irrigation systems. The netting is particularly desirable for use in golf courses, parks, median parkways, sod farms, and sporting facilities such as soccer, football or baseball fields or grass tennis courts. As can be appreciated, the netting can be used in a wide range of other locations as well. Generally speaking, the below ground capillary netting is most advantageously employed wherever a relatively continuous root zone exists throughout a landscape.

Figure 12:
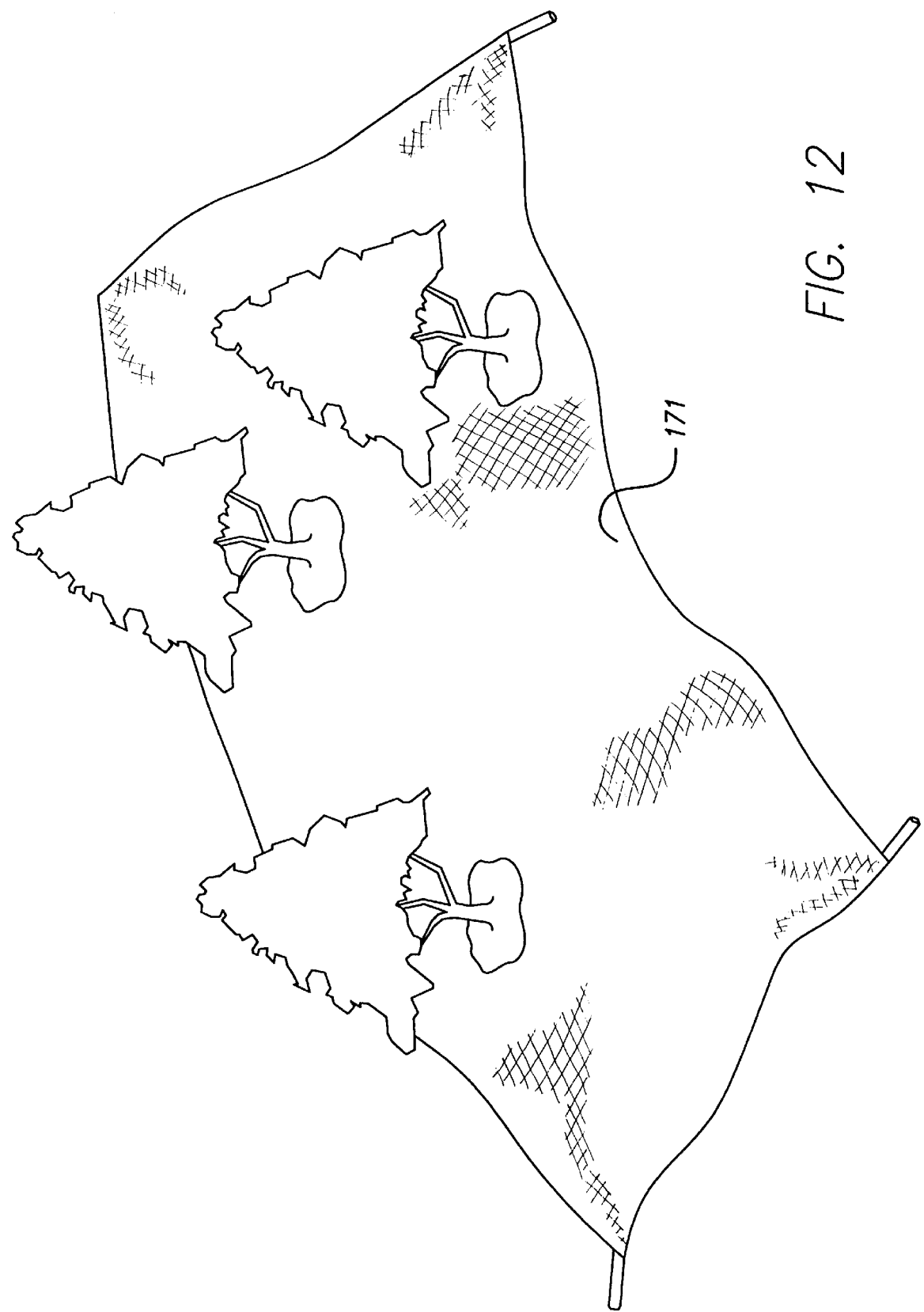
FIG. 12 illustrates the use of the capillary netting material for mounting over a landscape for drawing water to plants within the landscape while also reducing erosion of the landscape.

FIG. 12 illustrates another use of the capillary netting material. More specifically, FIG. 12 illustrates the capillary netting 171 mounted on top of a landscape including trees, shrubbery and the like. The netting is coupled to a nearby water source (not specifically illustrated in FIG. 12) for drawing water to the landscape. By positioning the netting on top of the landscape, rather than below turf as in FIG. 12, adequate watering of the plants in the landscape is achieved while maximum erosion control is also accommodated. As with the embodiment of FIG. 11, the netting may be cut and shaped as needed to accommodate the requirements of the particular terrain. Generally speaking, the above ground capillary netting is most advantageously employed with landscapes having discrete plants, particularly where soil erosion would otherwise be a problem. In some circumstances, both the above ground netting of FIG. 12 and the below ground netting of FIG. 11 are simultaneously employed.

Figure 13:
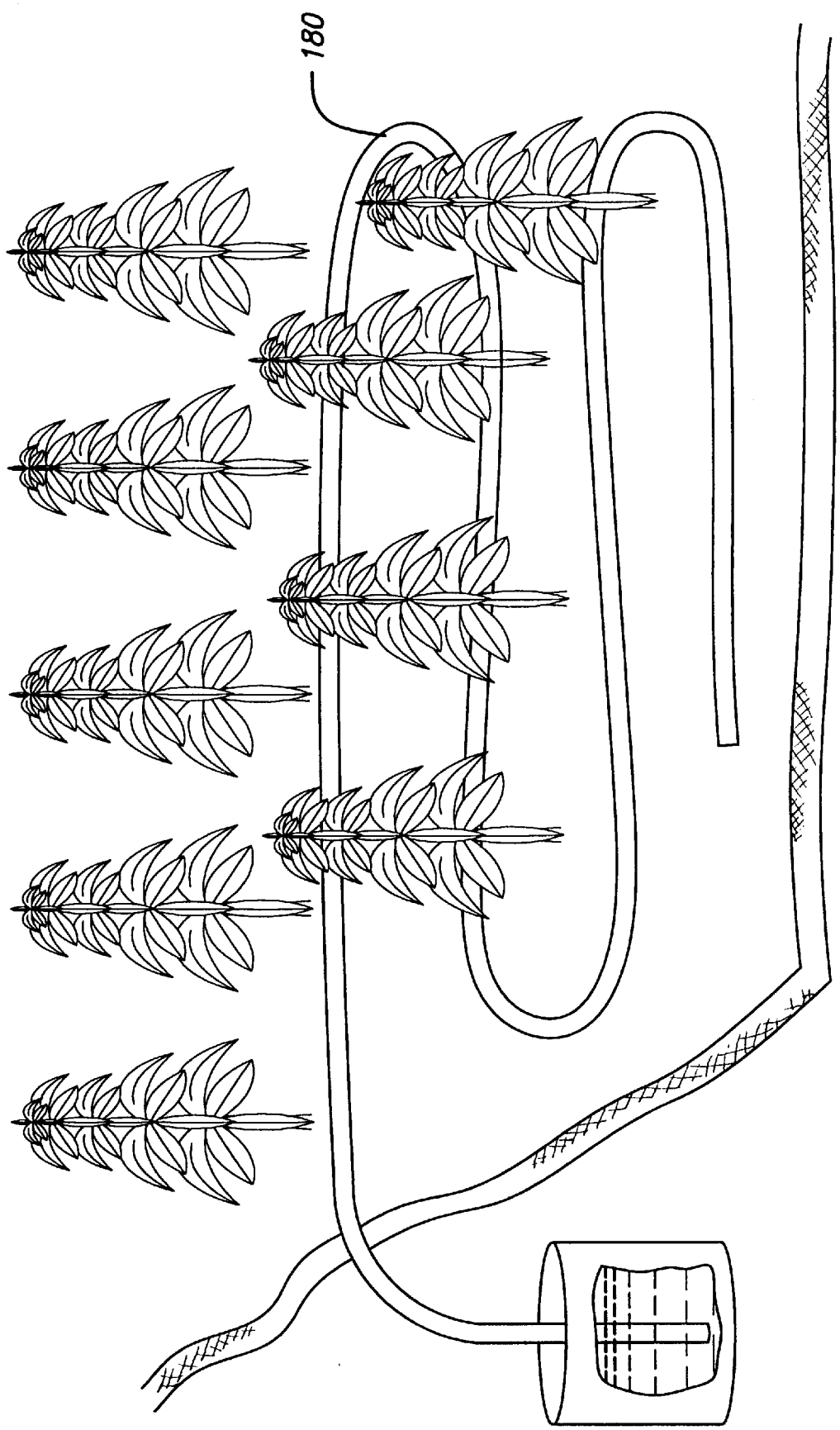
FIG. 13 illustrates a soaker hose covered with a capillary mesh for drawing water from a reservoir to individual plants.

FIG. 13 illustrates a capillary material soaker hose 180 for drawing water to various discrete plants within a landscape. The soaker hose is covered by a capillary material, such as spandex, with one end of the hose mounted within a water reservoir. The hose itself is disposed above ground in the vicinity of various plants for drawing water from the reservoir to the plants. As illustrated, the hose can be disposed in a generally serpentine manner to draw water to arbitrarily-spaced plants. The reservoir may include a float valve such that, when the level of liquid therein becomes low, the valve opens and the reservoir is again filled with water, perhaps from an underground water pipe or the like (not specifically shown in FIG. 13). As with the preceding couple of embodiments, water is drawn as needed by the plant thereby substantially preventing over watering. Also, little or no runoff occurs. The configuration of FIG. 13 is particularly advantageous for use in watering discrete plants in landscapes not subject to significant erosion, such as in generally level farms, gardens, groves and the like. If erosion is a problem, above-ground netting is preferably employed to minimize erosion.

Figure 14:
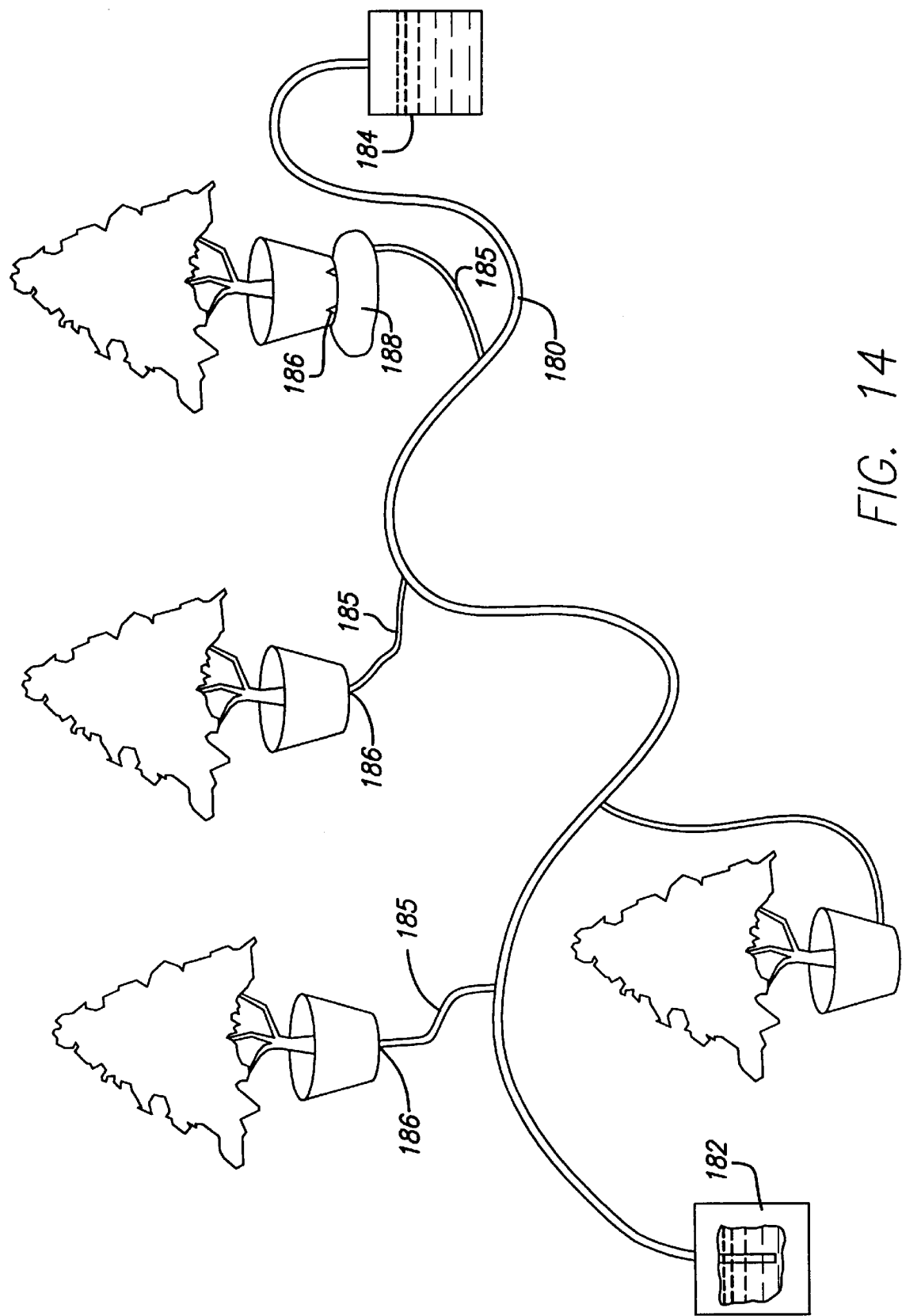
FIG. 14 illustrates a soaker hose filled with a capillary material for coupling water directly into flow hole inserts within individual planters.

FIG. 14 illustrates an alternative embodiment of the soaker hose of FIG. 13 wherein the hose is filled with a capillary material, such as spandex, rather than covered in a capillary mesh. More specifically, FIG. 14 illustrates a primary soaker tube 180 interconnected between two water supplies 182 and 184. Additionally, a set of spaghetti tubes 185 interconnect primary tube 180 to individual planters. The primary tube may be, for example, ⅝ inch flex tubing whereas the spaghetti tubes are ¼ inch tubing. The spaghetti tubes additionally include a capillary material, such as spandex, mounted therein. One end of each spaghetti tube is compression fitted into the primary soaker tube. This may be accomplished, for example, by piercing a small hole in the primary soaker tube then, before the hole closes, inserting an end of the spaghetti tube. In this manner, capillary material within the spaghetti tubes abuts capillary material within the primary tube to ensure flow of water from the primary tube into the spaghetti tube. An external end of each spaghetti tube is coupled to a flow hole insert 186 described above for mounting within the flow holes of the individual planters. In one implementation, the outer end of each spaghetti tube is mounted directly to the base of the flow hole insert, perhaps by compression fitting, screw fitting or similar means. In other cases, the outer end of the spaghetti tube is coupled to an intermediate capillary material 188 which is in turn coupled to the base of the flow hole insert. The intermediate capillary material may be, for example, a capillary mesh or netting material or perhaps a capillary bag of the type described above.

With configuration of FIG. 14, water is drawn by the primary soaker hose from the water supplies to the spaghetti tubes, then drawn via the spaghetti tubes into the flow hole inserts of the planters for watering soil in the planters. As with previous embodiments, by using capillary material, water is drawn to the planters on demand. Hence, over watering is substantially avoided and waste of water is minimized. Each reservoir may include float valves for detecting when the water level becomes low and for refilling the reservoir as needed from a water pipe or other water source (not specifically shown in FIG. 14). Alternatively, ends of the primary hose may be placed directly within permanent or semi-permanent water supplies, such as ponds, streams or lakes. In some cases, only one end of the primary hose will be mounted to a water supply.

What has been described are various exemplary embodiments of self-watering assemblies for use in watering plant, trees, turf or the like. The embodiments are merely illustrative of the invention. A wide range of other embodiments are consistent with the general principles of the invention.

What is claimed is:

1. A self-watering planter assembly for watering a plant within a planter, said assembly comprising:
   a hollow, water-permeable insert for at least partial insertion into an interior of the planter via a flow hole of the planter; and
   capillary material disposed within the insert, said capillary material including spandex.

2. The self-watering planter assembly of claim 1 wherein the water-permeable insert includes an open base with the capillary material filling the insert including the open base.

3. The self-watering planter assembly of claim 2 further including
   a reservoir for containing liquid; and
   a separate portion of capillary material coupling an interior of the reservoir to the capillary material of the base of the water-permeable insert.

4. The self-watering planter assembly of claim 3 wherein the reservoir includes a lid with an aperture formed therein and wherein a first portion of the separate portion of capillary material connects an interior of the reservoir to a top surface of the lid via the aperture such that water is drawn from the interior of the reservoir to the top surface of the lid.

5. The self-watering planter assembly of claim 4 wherein the lid of the reservoir is adapted to support the planter with base portions of the inserts of the planter disposed against portions of the capillary material connected to the top surface of the lid such that water drawn to the top surface of the lid is further drawn into the interior of the planter via the capillary material of the insert.

6. The self-watering planter assembly of claim 5 wherein a second portion of the separate portion of the capillary material substantially covers the lid of the reservoir.

7. The self-watering planter assembly of claim 3 wherein the separate portion of capillary material includes a large plurality of discrete capillary material pieces disposed between the reservoir and a base of the planter.

8. The self-watering planter assembly of claim 3 wherein the separate portion of capillary material includes a sheet adapted for covering a table upon which individual planters are disposed.

9. The self-watering planter assembly of claim 3 wherein the reservoir is a flexible, water-impermeable bag.

10. The self-watering planter assembly of claim 9 wherein the bag is pleated.

11. The self-watering planter assembly of claim 1 wherein the flow hole is of a predetermined size and wherein the water-permeable insert is substantially rigid and is sized so that, upon insertion into the flow hole, the insert fills the flow hole preventing soil from falling through the flow hole.

12. The self-watering planter assembly of claim 1 wherein the water-permeable insert is conic for insertion into a circular flow hole in a base of the planter.

13. The self-watering planter assembly of claim 1 wherein the flow hole is a slot formed in a lower side surface of the planter and wherein the water-permeable insert is U-shaped for insertion into the slotted flow hole, such that a first portion of the insert is insertable into an interior of the planter while a second portion of the insert lies adjacent to an outside surface of the planter.

14. The self-watering planter of claim 1 further including a soaker hose connecting a water supply to a base of the water-permeable insert.

15. The self-watering planter of claim 14 wherein the soaker hose is filled with capillary material.

16. The self-watering planter of claim 14 wherein the soaker hose is covered with a capillary material netting.

17. The self-watering planter of claim 14 wherein the soaker hose includes a primary portion connected to the water supply and secondary portions connecting the primary portion and the water-permeable insert.

18. The self-watering planter of claim 1 further including a capillary material bag mounted between a water supply and a base of the water-permeable insert.

19. The self-watering planter of claim 18 wherein the capillary material bag is filled with an inert porous material.

20. The self-watering planter of claim 19 wherein the inert porous material is perlite.

21. A self-watering planter assembly for watering a plant within a planter, said assembly comprising:
   a hollow, water-permeable insert for at least partial insertion into an interior of the planter via a flow hole of the planter;
   a reservoir for containing liquid;
   a capillary material incorporating spandex coupling an interior of the reservoir to an interior of the planter, wherein the capillary material includes
   a first separate portion coupling an interior of the reservoir to a base of the water-permeable insert, and
   a second separate portion filling the water-permeable insert,
   such that water is drawn from the reservoir to the base of the insert via the first portion of the capillary material and then from the base of the insert into soil of the planter via the second portion of the capillary material.

22. The self-watering planter assembly of claim 21 wherein the reservoir includes a lid with an aperture formed therein and wherein the first separate portion of capillary material connects an interior of the reservoir to a top surface of the lid via the aperture such that water is drawn from the interior of the reservoir to the top surface of the lid.

23. The self-watering planter assembly of claim 22 wherein the lid of the reservoir is adapted to support the planter with base portions of the inserts of the planter disposed against portions of the first separate portion of capillary material connected to the top surface of the lid such that water drawn to the top surface of the lids is further drawn into the interior of the planter via the capillary material of the insert.

24. The self-watering planter assembly of claim 23 wherein a third separate portion of the capillary material substantially covers the lid of the reservoir.

25. The self-watering planter assembly of claim 21 wherein the first separate portion of capillary material includes a large plurality of discrete capillary material pieces disposed between the reservoir and a base of the planter.

26. The self-watering planter assembly of claim 21 wherein the first separate portion of capillary material includes a sheet adapted for covering a table upon which individual planters are disposed.

27. The self-watering planter assembly of claim 21 wherein the reservoir is a flexible, water-impermeable bag.

28. The self-watering planter assembly of claim 27 wherein the bag is pleated.

29. A method for watering a plant planted within a planter having at least one flow hole, said method comprising the steps of:
   filling a hollow, rigid, water-permeable flow hole insert with capillary material incorporating spandex;
   inserting the flow hole insert into a flow hole of the planter with a top portion of the flow hole insert disposed against soil within the planter and a bottom portion of the flow hole insert exposed to an exterior of the planter; and
   applying liquid to a bottom portion of the capillary material within the flow hole insert such that liquid is drawn by capillary action through the insert and into the soil within the planter.

30. A self-watering planter assembly for watering a plant within a planter, said assembly comprising:
   a hollow, water-permeable insert for at least partial insertion into an interior of the planter via a flow hole of the planter, said water-permeable insert including an open base with capillary material formed of spander filling the insert including the open base;
   a reservoir for containing liquid, said reservoir including a lid with an aperture formed therein; and
   a separate portion of capillary material coupling an interior of the reservoir to the capillary material of the base of the water-permeable insert, with a first portion of the separate portion of capillary material connecting an interior of the reservoir to a top surface of the lid via the aperture and a second portion of the separate portion of the capillary material substantially covering the lid such that water is drawn from the interior of the reservoir to the top surface of the lid, and with the lid of the reservoir adapted to support the planter with base portions of the inserts of the planter disposed against the second separate portion of the capillary material such that water drawn to the top surface of the lid is further drawn into the interior of the planter via the capillary material of the insert.

31. In a self-watering planter assembly having a capillary material, an improvement comprising including spandex in the capillary material.

32. A self-watering planter assembly for watering a plant within a planter, said assembly comprising:
   a hollow, water-permeable insert for at least partial insertion into an interior of the planter via a flow hole of the planter, said insert having a conical portion for at least partial insertion into the flow hole and a substantially flat rim extending outwardly from a base of said conical portion; and
   capillary material disposed within the insert.

33. The self-watering planter assembly of claim 32, wherein said capillary material extends only slightly beyond the base of said conical portion of said insert.

34. A self-watering planter assembly for watering a plant contained within soil within a planter, said assembly comprising:
   a hollow, water-permeable insert for at least partial insertion into an interior of the planter via a flow hole of the planter; and
   capillary material formed of spander disposed within the insert; and
   wherein said insert has a large plurality of small apertures for permitting flow of liquid from an interior of the insert into the soil.

35. The self-watering planter assembly of claim 34 wherein at least a dozen of said apertures are provided.

* * * * *